(12) United States Patent
Kunkel et al.

(10) Patent No.: US 9,826,226 B2
(45) Date of Patent: Nov. 21, 2017

(54) EXPEDITED DISPLAY CHARACTERIZATION USING DIFFRACTION GRATINGS

(71) Applicant: Dolby Laboratories Licensing Corporation, San Francisco, CA (US)

(72) Inventors: Timo Kunkel, San Francisco, CA (US); Chun Chi Wan, San Francisco, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 93 days.

(21) Appl. No.: 14/996,165

(22) Filed: Jan. 14, 2016

(65) Prior Publication Data

US 2016/0227209 A1 Aug. 4, 2016

Related U.S. Application Data

(60) Provisional application No. 62/111,986, filed on Feb. 4, 2015.

(51) Int. Cl.
*G09G 5/39* (2006.01)
*H04N 5/225* (2006.01)
(Continued)

(52) U.S. Cl.
CPC ....... *H04N 17/004* (2013.01); *G02B 27/4205* (2013.01); *H04N 17/02* (2013.01)

(58) Field of Classification Search
CPC combination set(s) only.
See application file for complete search history.

(56) References Cited

U.S. PATENT DOCUMENTS 7,038,184 B2 * 5/2006 Chang ............... H01L 27/14621
250/208.1
7,227,592 B2 6/2007 Waters
(Continued)

FOREIGN PATENT DOCUMENTS

| CN | 103165099 | 6/2013 |
|---|---|---|
| WO | 2013/108032 | 7/2013 |
| WO | 2013/164015 | 11/2013 |

OTHER PUBLICATIONS

Alvarez, S. "Low Cost Recovery of Spectral Power Distributions" CEIG—Spanish Computer Graphics Conference, 2014, The Eurographics Association.
(Continued)

*Primary Examiner* — Wesner Sajous

(57) ABSTRACT

An image sensor of a camera configured with a diffraction grating is used to capture a diffraction image of an image rendering surface of a display device, for example, while a target image is being rendered on the image rendering surface of the display device. The diffraction image of the image rendering surface of the display device is analyzed to obtain measurements of native display capabilities of the display device. Display capability data is transmitted to a display management module for the display device. At least a portion of the display capability data is generated from the measurements of native display capabilities of the display device that are obtained from analyzing the diffraction image of the image rendering surface of the display device.

21 Claims, 16 Drawing Sheets

(51) Int. Cl.
    *H04N 17/00*     (2006.01)
    *H04N 9/73*     (2006.01)
    *H04N 5/57*     (2006.01)
    *G02B 27/42*     (2006.01)
    *H04N 17/02*     (2006.01)

(56) References Cited

U.S. PATENT DOCUMENTS

| | | |
|---|---|---|
| 8,098,374 B2 | 1/2012 | Wolleschensky |
| 8,789,952 B2 | 7/2014 | Okamoto |
| 2005/0237413 A1* | 10/2005 | Toba .................... H04N 1/3872 |
| | | 348/333.11 |
| 2009/0146982 A1 | 6/2009 | Thielman |
| 2010/0152847 A1* | 6/2010 | Padrick ................. A61B 3/152 |
| | | 623/6.11 |
| 2011/0273413 A1 | 11/2011 | Woestenborghs |
| 2012/0033066 A1 | 2/2012 | Wieser |
| 2013/0010262 A1 | 1/2013 | Sato |
| 2013/0278578 A1 | 10/2013 | Vetsuypens |
| 2014/0192209 A1 | 7/2014 | Yin |

OTHER PUBLICATIONS

Simple Low Resolution Spectroscopy of Bright Stars Using a Digital SLR Camera http://www.threehillsobservatory.co.uk/astro/spectroscopy_11.htm.

Mohan,A. et al "Agile Spectrum Imaging: Programmable Wavelength Modulation for Cameras and Projectors" Eurographics 2008, vol. 27, No. 2.

* cited by examiner use an image sensor of a digital camera configured with a diffraction grating to capture a diffractive image of an image rendering surface of a display device 502 analyze the diffractive image to obtain measurements of native display capabilities of the display device 504 transmit display capability data to a display management module for the display device 506

FIG. 5

EXPEDITED DISPLAY CHARACTERIZATION USING DIFFRACTION GRATINGS

CROSS-REFERENCE TO RELATED APPLICATIONS

The present application claims the benefit of priority from U.S. Provisional Patent Application Ser. No. 62/111,986, filed on Feb. 4, 2015, which is incorporated herein by reference in its entirety.

TECHNOLOGY

The present invention relates generally to image displays. More particularly, an embodiment of the present invention relates to expedited display characterization using diffraction gratings.

BACKGROUND

Display management operations can exploit actual capabilities of a display such as a consumer TV, etc., to render images with up to the highest color accuracy achievable by the actual display capabilities of the display. However, these operations relies on a relatively accurate understanding of these display capabilities in order to properly map image code values in an input media stream to device-specific drive values that exploit the actual capabilities of the display.

Display capabilities can be determined before a display leaves the factory. However, variations of actual display capabilities among different displays can be relatively high, depending on qualities and accuracies of components used when designing the displays and manufacturing the displays. Fluctuations may exist between designed display capabilities and actual display capabilities. For example, a design specification for a specific model may include a maximum luminance of 1000 nits with a white point of D65, whereas display as manufactured may vary +/−200 nits from the designed maximum luminance with white points of +/−500K from D65.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 3B through FIG. 3I illustrate example diffraction images;

FIG. 5 illustrates an example process flows; and

DESCRIPTION OF EXAMPLE EMBODIMENTS

Figure 1A:
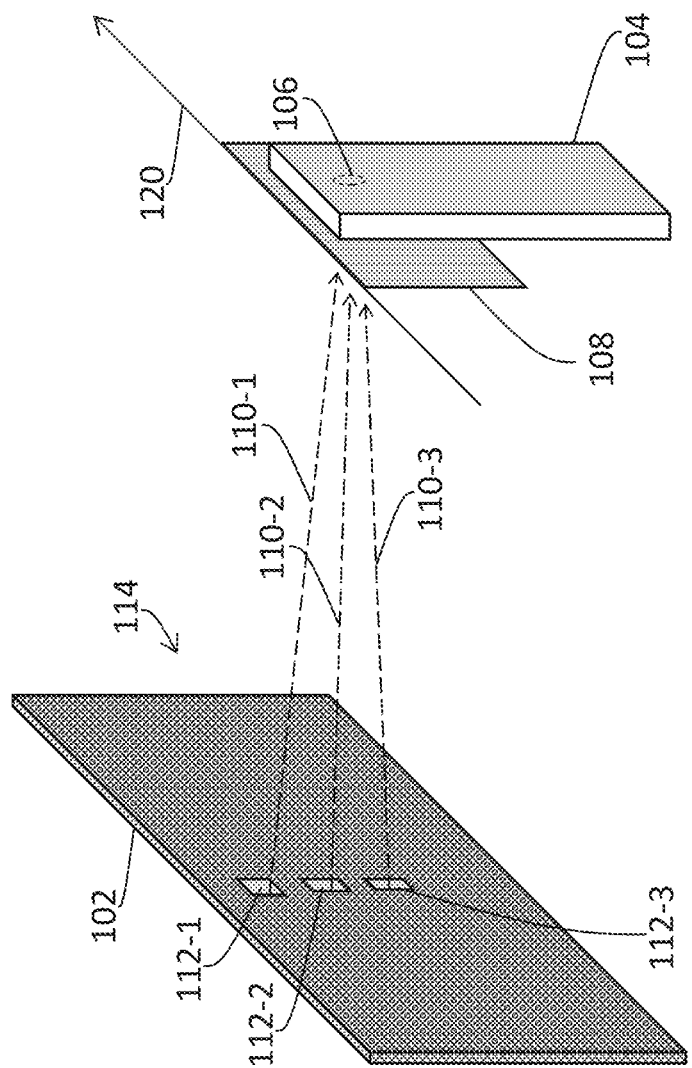
FIG. 1A and FIG. 1D illustrate example configurations that comprise an image rendering surface a display device and a camera with a diffraction grating.

Example embodiments, which relate to expedited display characterization using diffraction gratings, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. STRUCTURAL OVERVIEW
3. LIGHT DIFFRACTION
4. EXAMPLE SYSTEM CONFIGURATION
5. EXAMPLE SPECTRAL CHARACTERIZATION MODULE
6. SPECTRAL ANALYSIS OF DIFFRACTION IMAGES
7. EXAMPLE PROCESS FLOWS
8. IMPLEMENTATION MECHANISMS—HARDWARE OVERVIEW
9. EQUIVALENTS, EXTENSIONS, ALTERNATIVES AND MISCELLANEOUS

1. General Overview

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below.

In addition to variations of actual display capabilities and performance among different display devices rooted in manufacturing variability, problems with quality control, etc., in manufacturing processes, a number of factors in display rendering environments such as changes of display settings, aging effects of various components (e.g., light emitting diodes, liquid crystal display color filters, organic light emitting diodes, quantum dot films, plasma cells, etc.), etc., can affect behavior and performance of display devices. After a display device has been released to an end user, because of the complexity from this myriad of variations and factors affecting display capabilities, calibrations of a display device typically have to be carried out by service providers with expensive specialized electro-optical instruments, or not performed at all.

Techniques as described herein can be used to easily perform a spectral characterization of a display device such as a consumer television device, etc., using diffraction images captured with a camera equipped with a diffraction grating at low costs within short time periods (e.g., from seconds to no more than one minute, three minutes, etc.). In an exemplary embodiment, a diffraction grating is coupled to a mobile camera phone (e.g., integrated into a protective phone case, etc.), the mobile camera phone being electronically (e.g., through a USB connection, a Wi-Fi connection, etc.) coupled to a consumer display device. The mobile camera phone can transmit test images to, and use a built-in camera to take measurements of, the display device. These measurements (or parameters calculated therefrom) can then be transmitted to the display device or an external device such as a set-top box, etc., for performing improved display management operations with the display device.

Spectral characterizations of display devices as described herein can be carried out in a variety of setups and configurations. For example, spectral characterizations of display devices may be carried out with computing devices such as laptops, tablet computing devices, handheld computing devices, etc. In some embodiments, at least a part of spectral characterization techniques as described herein may be implemented in a computing device, for example, as a computer application (e.g., a Windows application, a mobile application, an IOS application, an Android application, etc.) that is installed or downloaded to the computing device that performs the spectral characterizations.

Additionally, optionally, or alternatively, spectral characterizations of display devices can be carried out with (e.g., dedicated, non-dedicated, etc.) webcams that may be mounted, attached, integrated, etc., with the display devices, or external devices such as set-top boxes, multimedia devices, etc. In some embodiments, a display device, an external device such as a set-top box, a multimedia device, etc., may implement at least a part of spectral characterization techniques as described herein.

Diffraction images as described herein may be captured by a camera equipped with a relatively low cost (e.g., linear, etc.) diffraction grating from an image rendering surface of a display device that is concurrently displaying a target image comprising one or more stimuli (e.g., one or more target patterns, one or more test target image portions, in an otherwise black background, etc.). The target image rendered on the image rendering surface may be sent by a computing device that includes or hosts the camera. For example, as soon as the computing device is connected with the display device, the display device may go into a calibration mode in which the display device receives target images automatically (e.g., without user input, etc.) sent by the computing device and generates stimuli on the image rendering surface, while the camera captures diffraction images of the target images as rendered on the image rendering surface.

Additionally, optionally, or alternatively, the target image may be sent to the display device from an external device other than a computing device that performs the spectral characterization of the display device.

In some embodiments, visual artifacts such as ambient light, reflections, misalignment, lens distortion, etc., can be removed from captured diffraction images before the "cleaned-up" diffraction images are used to extract spectral measurements or information related to determining display capabilities of the display device.

Scanlines on the above-mentioned diffraction images may be analyzed to produce intensity distributions of light diffracted from the stimuli rendered by the display device. Using one or more of a variety of techniques including, but not limited to only, virtual line scanning, deconvolution, advance noise reduction functions, etc., these intensity distributions derived from the scanlines of the diffraction images can be used to generate a spectral power distribution, etc., of the display device. The spectral power distribution itself may be provided as an input to display management operations. Additionally, optionally, or alternatively, one or more of display primaries (or primary colors), white points, display non-linearity (e.g., gray levels with color tints, etc.), etc., can be derived from the spectral power distribution, for example, using color mapping functions, etc.

Quantitative or qualitative assessments about color rendering qualities of the display device can also be made based on the spectral power distribution, for example, in comparison with reference spectral power distributions. A Rec.2020 display device may produce very narrow band display primaries in the spectral power distribution; a light emitting diodes display device may produce slightly wider band display primaries; a cold-cathode fluorescent lamp (CCFL) display device may produce gas-like bands in the spectral power distribution. Spectral power distributions generated under techniques as described herein can also be used to compute custom color transform matrices that may vary from display device to display device to compensate for variations and display rendering environmental factors, etc.

A spectral power distribution provides an overall description of color rendering ability of a display device, and thus, in some embodiments, may be used for spectral color processing that support relatively large color gamut display operations by making use of multiple sets of display primaries, additional display primaries (or additional primary colors), additional mixed colors outside of a color gamut formed by three display primaries, etc.

In some embodiments, a maximum luminance level of a display device can be (e.g., approximately, accurately, etc.) determined by analyzing a stimulus (e.g., light from a test pattern as rendered by the display device, light from a specific portion of a test pattern rendered by the display device, etc.) with a series of diffraction images captured with different exposure times. Saturation levels, clipping thresholds, etc., of image sensors can be used to provide a reference to deduce a combination of luminance level and exposure time above which the image sensors reach the saturation levels or clipping thresholds in sensory responses and then used to calibrate, obtain, or estimate absolute spectral power values at different wavelengths based on the series of diffraction images with different exposure times.

Display management operations for a display device can use, and can be covariant over the lifetime of the display device with variations of, display capabilities of the display device determined in spectral characterizations as described herein. Display capability information or parameters can be used to set anchor points or pivots for transfer curves used in color mapping operations, downsampling operations, upsampling operations, dynamic range mapping operations, etc., in display applications. The display capability information or parameters can also be used to support image rendering operations related to perceptually encoded video signal, to modify high dynamic range graphic overlays, etc., in display applications.

Techniques as described herein provides a simple, fast, and a low cost approach for end users or consumers to gather qualitatively or quantitatively accurate target display parameters of a display device in situ in a display rendering environment in which the display device operates. In some embodiments, these techniques can be used to avoid adjustment errors resulted from unreliable, subjective assessment of display qualities made by users in such a display rendering environment. For example, these techniques can be used to prevent inadvertent adjustments of brightness, contrast, color, etc., of the display device to incorrect settings that decrease image qualities and media experiences of an otherwise high-end display device.

In some embodiments, mechanisms as described herein form a part of a media processing system, including, but not limited to: a professional display device, a consumer display device, a multimedia system, a handheld device, game machine, television, laptop computer, tablet computer, netbook computer, cellular radiotelephone, projectors, cinema system, electronic book reader, point of sale terminal, desktop computer, computer workstation, computer kiosk, or various other kinds of terminals and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Structural Overview

FIG. 1A illustrates an example configuration that comprises an image rendering surface 114 of a display device 102 and a camera 106 with a diffraction grating 108 positioned in between the image rendering surface (114) and the camera (106).

In some embodiments, the camera (106) comprises software, hardware, a combination of software and hardware, etc., such as an electro-optical configuration including but not limited to an image acquisition controller, an aperture, one or more lenses, zero or more filters, one or more image sensors, programmatic and/or manual mechanisms to control settings (e.g., focal length, aperture size, exposure time, etc.) and operations of the camera (106) for the purpose of obtaining images from incoming light captured by (or entering into) camera (106), etc. As illustrated in FIG. 1A, an example of the camera (106) may be, but is not limited to, a point-and-shoot camera that is a part of a mobile device 104 (e.g., an iPhone, an Android device, a Windows phone, etc.). Other examples of the camera (106) may include, but are not limited to only, any of: digital cameras, non-digital cameras, analog camera, camera equipped with photosensitive chemicals, etc.

In some embodiments, the diffraction grating (108) refers to an optical component that comprise a periodic structure that can be used to diffract incoming light of different wavelengths into different spatial angles in outgoing light. In some embodiments, the diffraction grating (108) is a (linear) diffraction grating comprising one or more periods along a linear spatial direction 120. It should be noted that in various embodiments, any of a variety of diffraction gratings (e.g., star gratings, multiple overlaid linear gratings, concentric ring grating, gratings with one or more periods and/or with variable periods, etc.) other than linear diffraction gratings can also be used.

The diffraction grating (108) can be mounted or placed in front of the camera (106) in many different ways. In an example, the diffraction grating (108) can be manually mounted in front of the camera (106) (e.g., a mobile phone camera, etc.). In another example in which the camera (106) is a dedicated camera for a display device, a diffraction grating can be delivered already mounted with the dedicated camera. In some embodiments, the diffraction grating (108) may be built in with a phone in an area corresponding to where a lens of a mobile phone camera is to be located. In some embodiments, the diffraction grating (108) can simply be affixed to a camera or a phone by using a temporary setup such as Scotch tape or similar, handholding in front of the lens of the camera for the duration of diffraction image capturing, etc.

In some embodiments, the image rendering surface (114) may refer to a surface on which images can be rendered by the display device (102) using modulated light. The image rendering surface (114) may be any image rendering surface related to cathode ray tube (CRT) televisions; liquid crystal display (LCD) panel with light sources based on cold-cathode fluorescent lamps (CCFL), light emitting diodes (LEDs), quantum dot, etc.; organic LED displays; LED displays, front projection displays; rear projection displays; laser based projection or backlight, etc.

In some embodiments, the display device (102) comprises software, hardware, a combination of software and hardware, etc., configured to control generation of modulated light in an image rendering surface (e.g., 114, etc.) in the display device (102) for the purpose of rendering images on the image rendering surface (114).

In some embodiments, the camera (106) is configured to capture, record, etc., diffraction images of the image rendering surface (114). The diffraction images may be formed at least in part by light as diffracted by the diffraction grating (108). The diffraction images may also comprise light contributions from noises, ambient light, non-optical artifacts such as sensor noise, compression artifacts, bandwidth limitations, etc., that exist in a display rendering environment in which the image rendering surface (114) is situated.

In some embodiments, a target image comprising one or more stimuli (e.g., 112-1, 112-2, 112-3, etc.) may be rendered on the image rendering surface (114). Light (e.g., 110-1, 110-2, 110-3, etc.) emitted from the stimuli (112-1 through 112-3) on the image rendering surface (114) passes through the diffractive grating (108). A first diffraction image of the image rendering surface (114) with the stimuli (112-1 through 112-3) can be captured, recorded, etc., by the camera (106) with diffractive light generated from the incoming light (110-1 through 110-3).

In some embodiments, a second diffraction image of the image rendering surface (114) with no stimuli (112-1 through 112-3) can be captured, recorded, etc., by the camera (106). The second diffraction images may comprise noises, ambient light, etc., similar to noises, ambient light, etc., comprised in the first diffraction image. The image rendering surface (114) as captured by the second diffraction image may be a black screen at an off state for a normally black display device, a black screen generated by setting pixels to dark black pixel values, a black screen generated by setting pixels to the lowest light transmittance, etc.

Light from common types of light sources such as incandescent, CCFL, LEDs, etc., is composed of a multitude of different wavelengths at different energy intensities. This composition is commonly called spectral power distributions (SPDs) of light sources. A spectral power distribution of a light source used by the display device (102) for rendering images on the image rendering surface (114) may be different from a spectral power distribution of light from the image rendering surface (114) depending on a current state of an optical configuration of the display device (102). In some embodiments, the light from the image rendering surface (114), rather than light from the light source directly, can be captured, sensed, or measured by a spectral characterization module (e.g., 118 of FIG. 1D, etc.) operating in conjunction with the camera (106). The light from the image rendering surface (114) can be used to obtain a spectral power distribution of the display device (102).

The width of a stimulus (e.g., a patch, etc.) on the image rendering surface exerts an impact on light intensity recorded at a location of the first-order diffraction image area of a captured diffraction image. The wider the stimulus, the better the signal to noise ratio on the captured diffraction image, but the more the spectral power distribution of light from the image rendering surface (114) is convolved with the shape of the stimulus on the image rendering surface (114). In some embodiments, a series of varying stimulus widths can be captured in one or more diffraction images.

In some embodiments, the dynamic range of the display device (102) can be assessed by setting the background of the image rendering surface (114) to dark, except for the one or more stimuli, to minimize the ambient light scattering. In some embodiments, by placing stimuli such as bars at different locations of the image rendering surface (114), color stability in different locations of the image rendering surface (114) can be measured.

Spectral power distributions of the display device (102) can be used to characterize display capabilities of the display device (102). The way wavelengths are distributed in the spectral power distributions as measured or sensed based on light from the image rendering surface (114) of the display device (102) determines to a large extent the physical part of what color rendition the display device (102) will create when an observer looks at the image rendering surface (114).

In some embodiments, one or more actual spectral power distributions of the display device (102) may be used to determine whether there is a local or global color shift based on determining whether there is a difference between the one or more actual spectral power distributions and a reference spectral power distribution (e.g., as released or defined by a manufacturer, as released or defined by a standard setting body, as stored in a spectral characterization module, etc.). If differences are detected between the one or more actual spectral power distributions and the reference spectral power distribution in certain wavelengths, the differences may be provided to and/or used by a display management module (e.g., a set-top box, a display device, etc.) to compensate for the differences.

In some embodiments, humps of the one or more actual spectral power distribution of the display device (102) may change (e.g., 5%, 10%, etc.) such as are slightly higher, slightly lower, etc., relative to humps of the reference spectral power distribution. As a result, the white point may be shifted or exhibit a color tint. In addition, changes in spectral power distribution cause variations in chromaticity and luminance levels in the display device (102). These differences in spectral power distribution may generate an undesirable effect on picture appearance when images are rendered by the display device (102) unless corrective actions such as display management, turning knobs that control display parameters, etc., are performed to remove or ameliorate the color tint, variations in chromaticity and luminance levels, etc.

Techniques as described herein can be used to obtain spectral power distributions of display devices before or after the display devices are released to end users or consumers. The techniques enable acquisition of spectral power distributions of display devices at relative ease with low costs in short time periods (e.g., no more than one minute, etc.). The spectral power distributions of the display device (102), information, variations, parameters, etc., derived from the spectral power distributions, etc., can be sent to the display device (102) for performing self-calibration operations, or an external device such as a set-top box, etc., for performing display management including but not limited to modifying video signals that are sent to the display device (102).

The spectral power distribution of the light from the image rendering surface (114) can be made visible using the diffraction grating (108), which disperses light similar to the effect of a prism. The direction (angle) of this dispersion depends on the wavelengths of the electromagnetic radiation (light). For example, longer wavelength (e.g. "red", etc.) light gets dispersed with a different angle than short wavelength (e.g. "blue", etc.) light. Based on this principle, an angle of dispersion generated by the diffraction grating (108) can be used to determine a corresponding wavelength of light that is being diffracted into the angle.

3. Light Diffraction

Figure 1B:
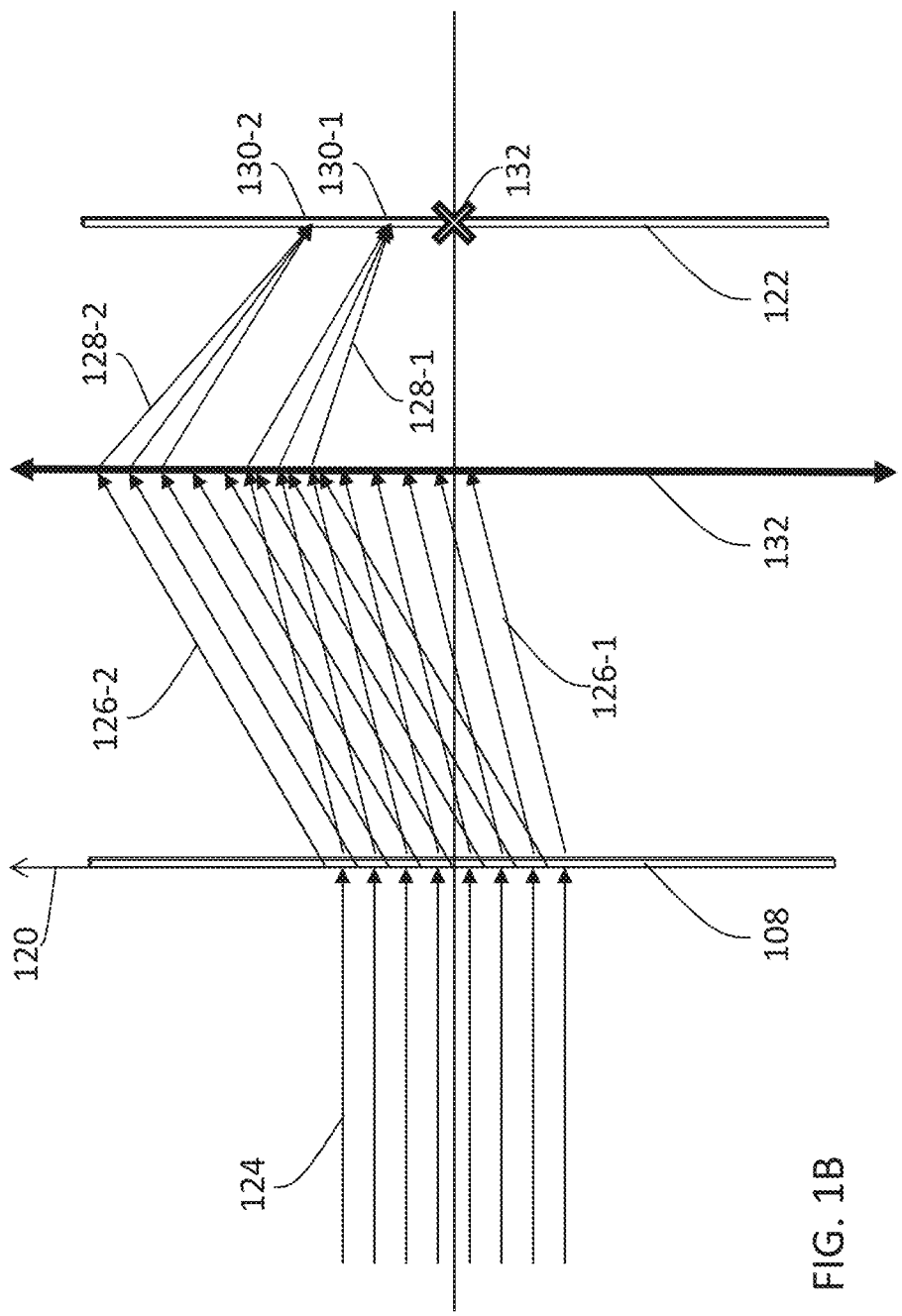
FIG. 1B and FIG. 1C illustrate example dispersion of light diffracted from a diffraction grating.

FIG. 1B illustrates example dispersion of light 124 coming from an image rendering surface (e.g., 114 of FIG. 1A, etc.) as diffracted or dispersed by a diffraction grating (e.g., 108 of FIG. 1A, etc.) with a periodic structure along a spatial direction (e.g., 120 of FIG. 1A, etc.). For the purpose of illustration only, the incoming light (124) is represented as parallel light (e.g., from a sufficiently far distance as compared with diffraction grating periods, a focal length of a camera, an aperture of the camera, etc.). As shown in FIG. 1B, light of a first wavelength in the incoming light (124) is diffracted into first-order diffraction light 126-1 of a first angle relative to the (e.g., horizontal as depicted in FIG. 1B, etc.) direction of the incoming light (124). Light of a second wavelength (which is longer than the first wavelength) in the incoming light (124) is diffracted into first-order diffraction light 126-2 of a second angle relative to the direction of the incoming light (124).

The first-order diffraction light (126-1) and the first-order diffraction light (126-2) may pass through an aperture (not shown) of a camera (e.g., 106 of FIG. 1A, etc.), incident on a lens 132 (which may be an effective lens representing one or more physical lenses) of the camera (106), and get focused by the lens (132) into collected light 128-1 and 128-2, respectively. The collected light (128-1) may form a line segment (e.g., vertical to the picture plane of FIG. 1B, etc.) on an image sensor 122 of the camera (106) as represented by an image point 130-1, which is displaced at a first distance from an image point 132 of zeroth-order diffraction light of the incoming light (124). The collected light (128-2), on the other hand, may form a line segment (e.g., vertical to the picture plane of FIG. 1B, etc.) on the image sensor (122) as represented by an image point 130-2, which is displaced at a second distance from the image point (132).

Figure 1C:
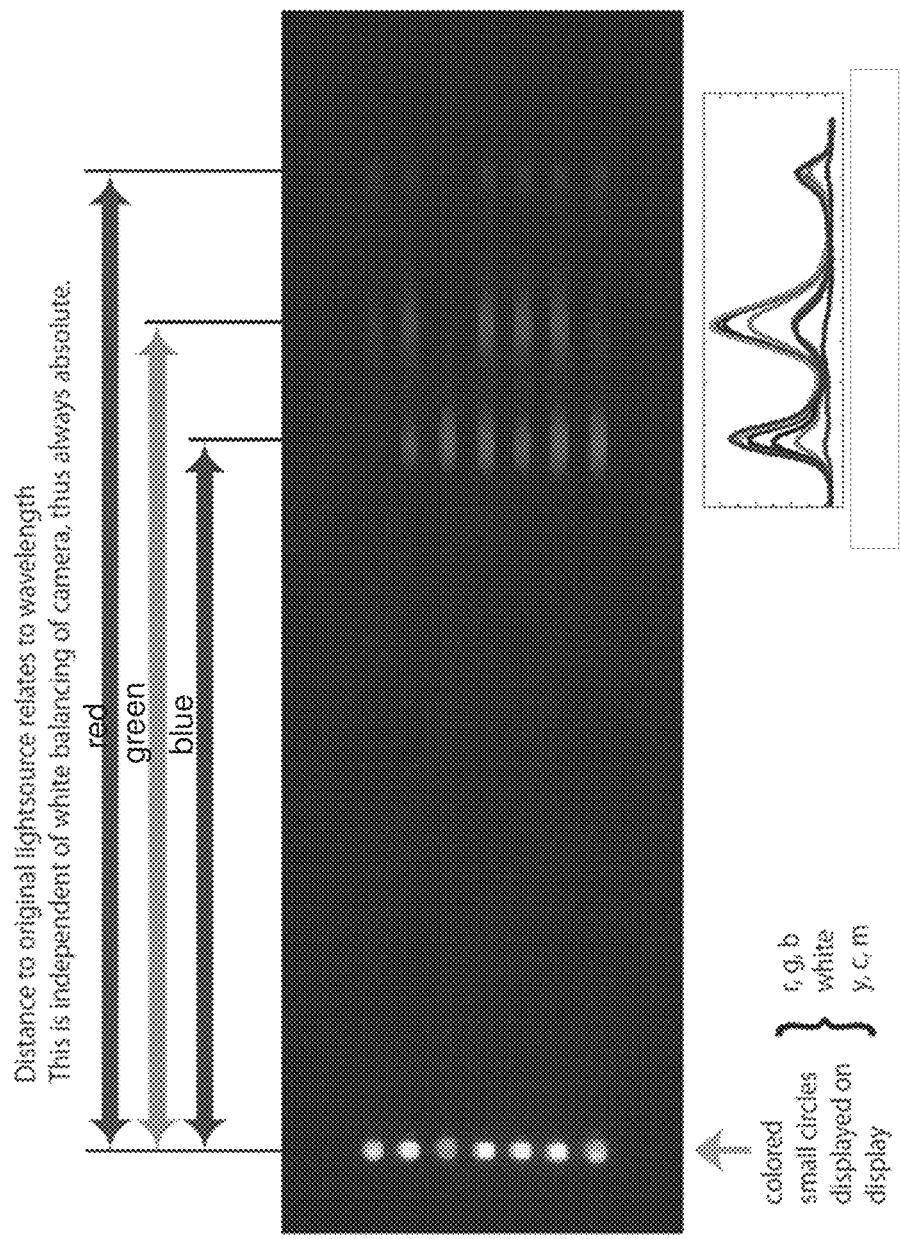

Thus, a distribution of wavelengths in the incoming light (124) from the image rendering surface (114) may be diffracted into a spectral-spatial distribution (e.g., as illustrated in FIG. 1C, etc.) comprising light of different wavelengths at different spatial locations as captured by the image sensor (122). A distance of a wavelength to the (reference) image point (132) representing zeroth-order (or no) diffraction light can be represented or measured by the number of pixels from the image point (132) in pixel units, or by a SI length unit (e.g., meter, etc.) if pixel size of the image sensor (122) is known. This distance can be used to deduce the (corresponding) wavelength if the diffraction grating period and the focal length of the lens (132) are known.

While FIG. 1B illustrates a simplified diffraction model, more complex and more numerically accurate diffraction model can be similarly built given (e.g., geometrical, sensor-related, etc.) parameters of the diffraction grating, the camera (106), the image sensor (122), etc. For example, in some embodiments, a pixel, a pixel column, a pixel patch, etc., as displayed in a stimulus on the image rendering surface (114) may be modeled as a weighted sum (e.g., as defined by a point spread function, etc.) of different sets of parallel light emitting from one or more point light sources located at finite distances to the diffraction grating (108).

4. Example System Configuration

Figure 1D:
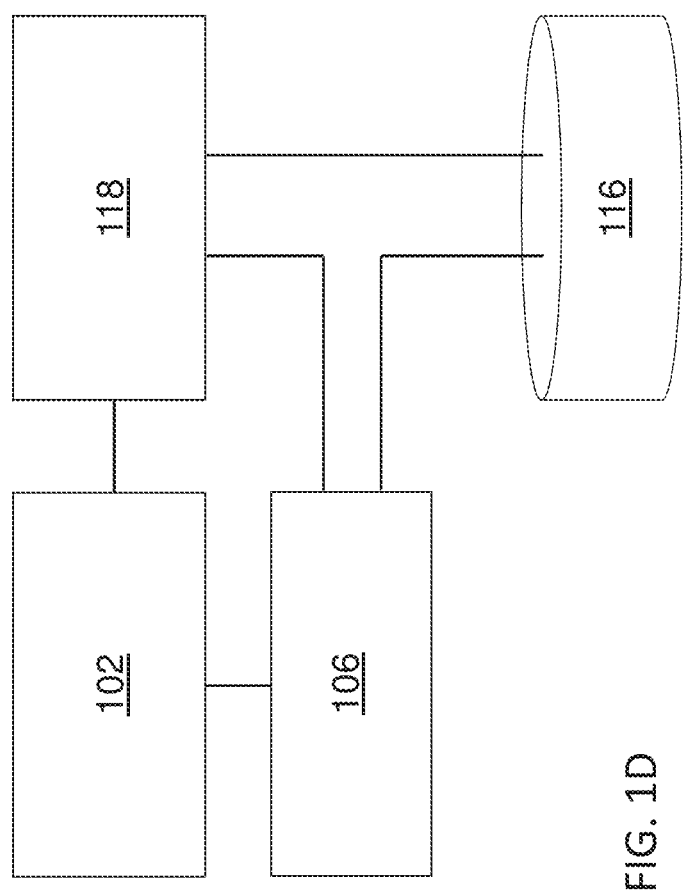

FIG. 1D illustrates an example block diagram of a system that comprises a display device (e.g., 102, etc.) with an image rendering surface (e.g., 114, etc.); a camera (e.g., 106, etc.) with a diffraction grating 108 positioned or mounted in between the image rendering surface (114) and the camera (106); a spectral characterization module 118; a display capability data repository system 116; etc. Some or all of the components, devices, systems, modules, etc., in FIG. 1D may be operatively linked through one or more computer networks such as one or more of wide area networks (WANs), local area networks (LANs), USB data links, Bluetooth data links, Wi-Fi networks, etc. In some embodiments, at least one (e.g., the display capability data repository system 116, etc.) of the components, devices, systems, modules, etc., in FIG. 1D may be optional.

In some embodiments, the spectral characterization module (118) comprises software, hardware, a combination of software and hardware, etc., configured to receive diffraction images acquired by the camera (106); perform one or more of measurement operations, calibration operations, spectral analysis operations, etc., on the diffraction images; etc. generate one or more of spectral measurement data, spectral power distribution (SPD) data, display capability descriptors, etc., based on the diffraction images; etc. Additionally, optionally, or alternatively, the spectral characterization module (118) may be configured to transmit the display capability data such as spectral measurement data, spectral power distribution (SPD) data, display capability descriptors, etc., to the display capability data repository system (116); receive one or more of analytical results, calibration data, display management data, etc., from the display capability data repository system; etc.

The display capability data repository system (116) comprises software, hardware, a combination of hardware and software, etc., configured to store display capability data such as spectral measurement data, SPD data, etc., as received from a plurality of spectral characterization modules (e.g., 118, etc.); etc. The display capability data repository system (116) can be configured to support data access operations, data modification operations, data creation operations, etc., related to the display capability data maintained in the display capability data repository system (116). Additionally, optionally, or alternatively, the capability data repository system (116) is further configured to generate one or more of analytical results, calibration data, display management data, etc., based at least in part on the display capability data received from the spectral characterization modules; send at least a portion of the analytical results, calibration data, display management data, etc., to another device such as a display device (e.g., 102, etc.), a spectral characterization module (e.g., 118, etc.); etc.

5. Example Spectral Characterization Module

Figure 2:
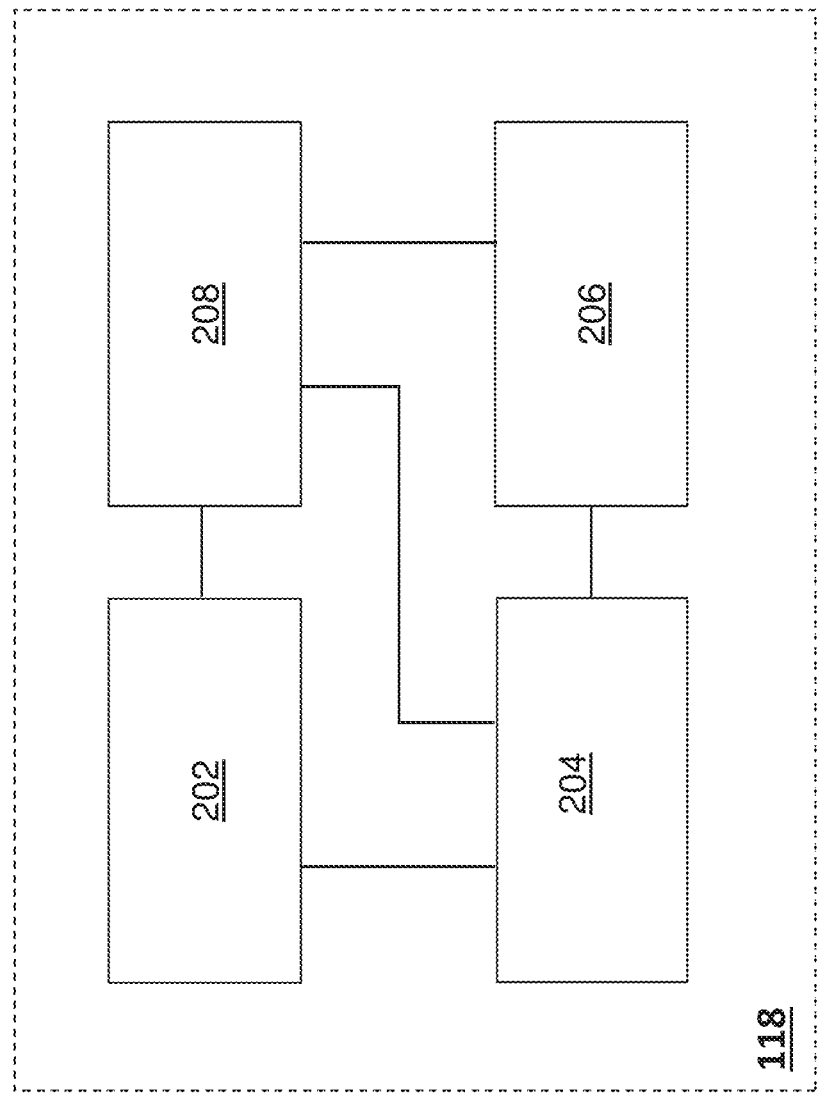
FIG. 2 illustrates an example spectral characterization module.

FIG. 2 illustrates an example spectral characterization module (e.g., 118, etc.). The spectral characterization module (118) can be configured to use a camera (e.g., 106 of FIG. 1A or FIG. 1D, etc.) such as a camera of a mobile device (e.g., 104 of FIG. 1A, etc.) with a relatively low cost and simple diffraction grating (e.g., 108 of FIG. 1A, etc.) in front of an aperture of the camera (106) to carry out a spectral characterization of a display device (e.g., 102 of FIG. 1A or FIG. 1D, etc.).

In some embodiments, that spectral characterization module (118) comprises an image acquisition controller 202, an image processor 204, a display capability measurement unit 208, a spectral analyzer 206; etc. Some or all of the components, devices, systems, modules, etc., in FIG. 2 may be operatively linked through one or more computer networks such as one or more of WANs, LANs, USB data links, Bluetooth data links, Wi-Fi networks, etc. In some embodiments, at least one of the components, devices, systems, modules, etc., in FIG. 2 may be optional.

In some embodiments, the spectral characterization module (118) is implemented in a separate device that is external to one or both of the camera (106) and the display device (102). In some embodiments, at least a part of the spectral characterization module (118) is implemented in a part of the camera (106) and/or the display device (102). In some embodiments, some or all of the spectral characterization module (118) may be implemented in a module device (e.g., 104 of FIG. 1A, etc.) with the camera (106), for example, as a mobile application (e.g., an IOS application, an Android application, etc.) that is installed or downloaded to the mobile device (104).

Figure 3A:
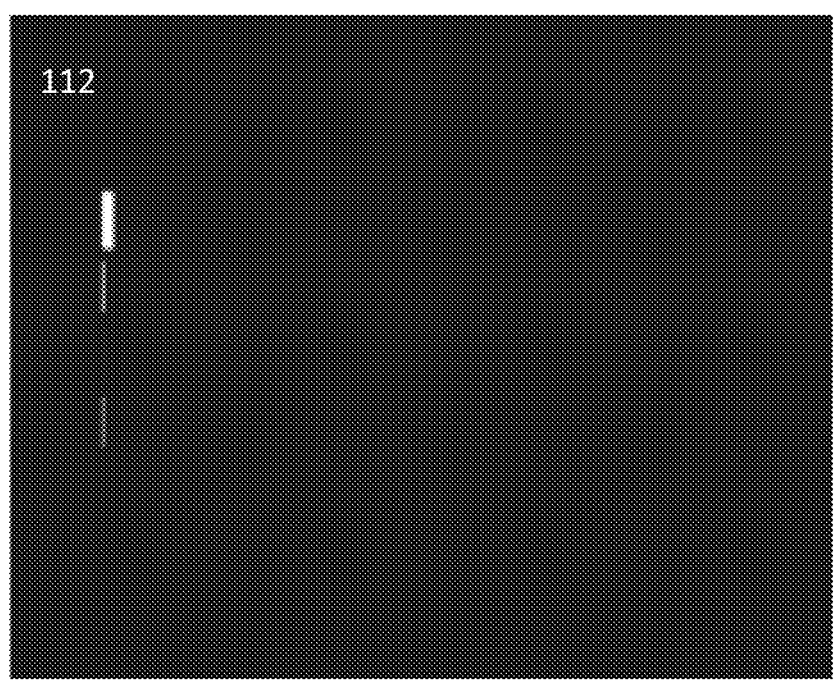
FIG. 3A illustrates example target images.
Figure 3H:
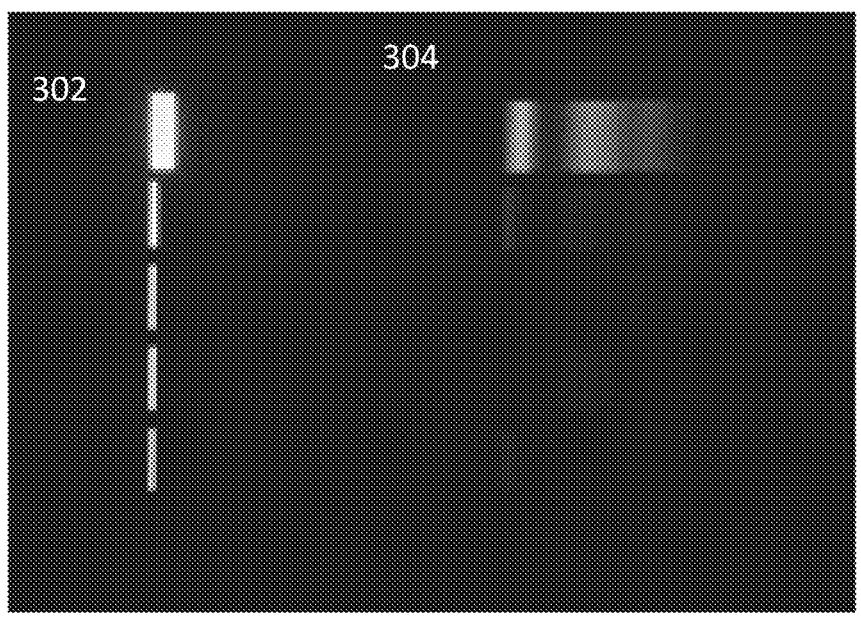
Figure 3B:
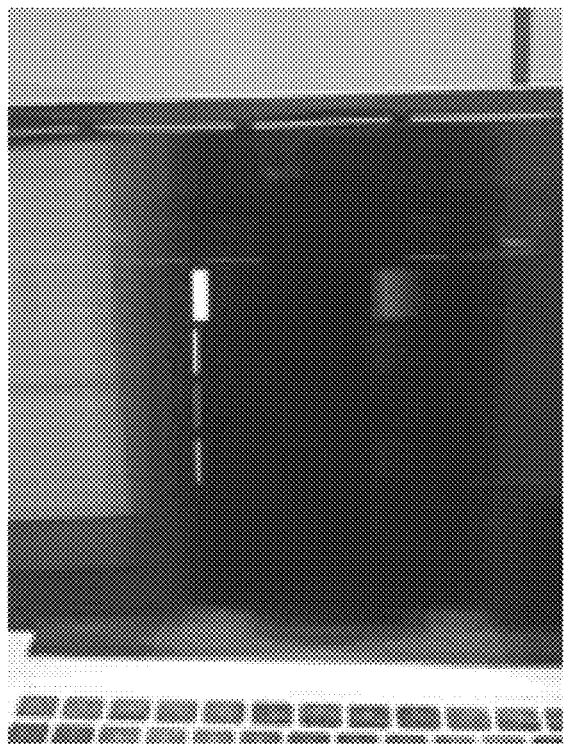
Figure 3C:
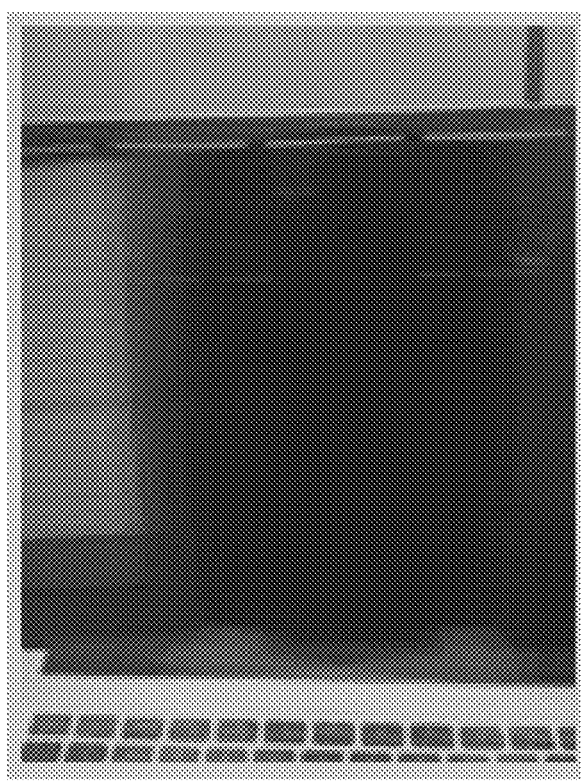

In some embodiments, the image acquisition controller (202) comprises software, hardware, a combination of hardware and software, etc., configured to cause target images (e.g. as shown in FIG. 3A) to be rendered by the display device (102) on an image rendering surface (e.g., 114 of FIG. 1A, etc.); cause the image rendering surface (114) to render a dark screen (e.g., by setting a light modulation layer of the display device 102 to the lowest light transmittance, etc.), to turn off the display device (102) if the display device is a normal black display device at a voltage-off state, etc.; to cause the camera (106) to capture, record, etc., diffraction images (as shown in FIG. 3B and FIG. 3C, etc.) of the image rendering surface (114) concurrently while the image rendering surface (114) is rendering the target images, is displaying the dark screen, etc.

In some embodiments, the image acquisition controller (202) is configured to transmit signal data, messages, etc., to other devices such as the display device (102), the camera (106), etc.; receive signal data, messages, etc., from other devices such as the display device (102), the camera (106), etc.; etc. In some embodiments, image data for at least one of the target images is sent by the image acquisition controller (202) over one or more network connections (e.g. HDMI, Screen Mirroring, Apple AirPlay, Google Chromecast, Wi-Fi network connections, etc.) to the display device (102) for the latter to render on the image rendering surface (114).

In some embodiments, a dedicated camera such as a webcam, etc., may be supplied, bundled, or sold separately, with the display device (102). When the dedicated camera is connected to a data port such as a USB port, etc., of the display device (102), the display device (102), which may comprise the spectral characterization module (118), can be set to a calibration mode in which the display device (102) generates target images with stimuli on the image rendering surface (114) and captures diffraction images of the image rendering surface (114) with the dedicated camera.

In some embodiments, instead of causing target images to be rendered by the display device (102) on the image rendering surface (114) by the spectral characterization module (118), target images with stimuli may be played back from an image data store or source external to the display device (102) and to the spectral characterization module (118). For example, at least some of the target images may be played from an external image data store or source such as a BluRay media device, etc.

Additionally, optionally, or alternatively, the spectral characterization module (118) can receive user input that represents user commands. In response to receiving the user commands, the spectral characterization module (118) can capture, record, etc., diffraction images of the image rendering surface (114) while a target image from an external image data store or source is being rendered on the image rendering surface (114).

Additionally, optionally, or alternatively, a target image may comprise a visual feature for identification, such as a specific image pattern that is still visible after being diffracted, etc. The spectral characterization module (118) that captures a diffraction image of the target image can identify and analyze the target image based on the visual feature for identification, for example, when the target image was retrieved from an external image data store or source.

Techniques as described herein do not require spectral characterization of a display device to be carried out in a strict controlled environment such as in the factory, in the laboratory, etc. These techniques can support spectral characterizations of display devices in a wide variety of display rendering environments in which the display devices are located. Further, the spectral characterizations can be carried out using cameras of many different types (e.g., digital cameras, non-digital cameras, etc.) with diffractive gratings of many different types.

Diffraction images obtained by a camera such as 106 of FIG. 1A or FIG. 1D, etc., may be of different qualities, comprise various environmental effects such as light reflections, ambient light, lens distortions, etc.

In some embodiments, the image processor (204) comprises software, hardware, a combination of hardware and software, etc., configured to remove or reduce various environmental effects such as light reflections, ambient light, lens distortions, etc., from a first diffraction image (e.g., as illustrated in FIG. 3B, etc.) of the image rendering surface (114) that is rendering a target image (e.g., as illustrated in FIG. 3A, etc.) that comprises one or more stimuli 112 (e.g., 112-1, 112-2, 112-3, as illustrated in FIG. 1A, etc.).

In some embodiments, in addition to capturing, recording, etc., the first diffraction image, the camera (106) also captures, records, etc., a second diffraction image (e.g., as illustrated in FIG. 3C, etc.) of a dark screen of the image rendering surface (114).

Figure 3D:
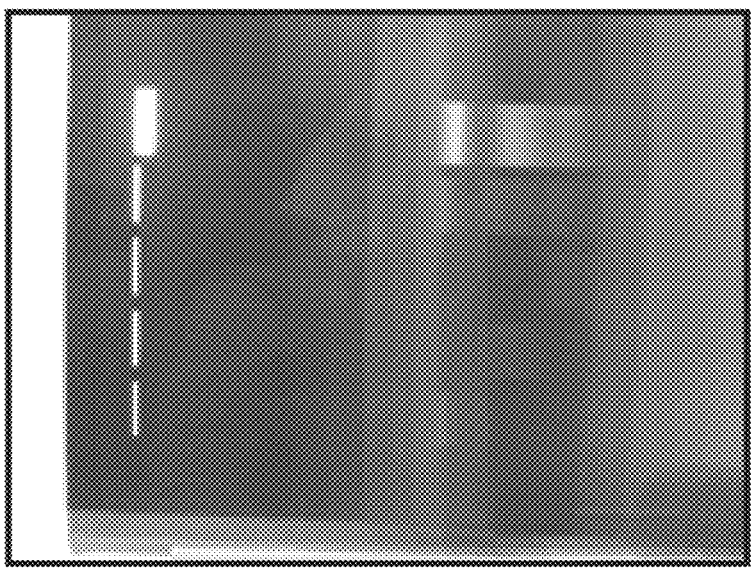
Figure 3E:
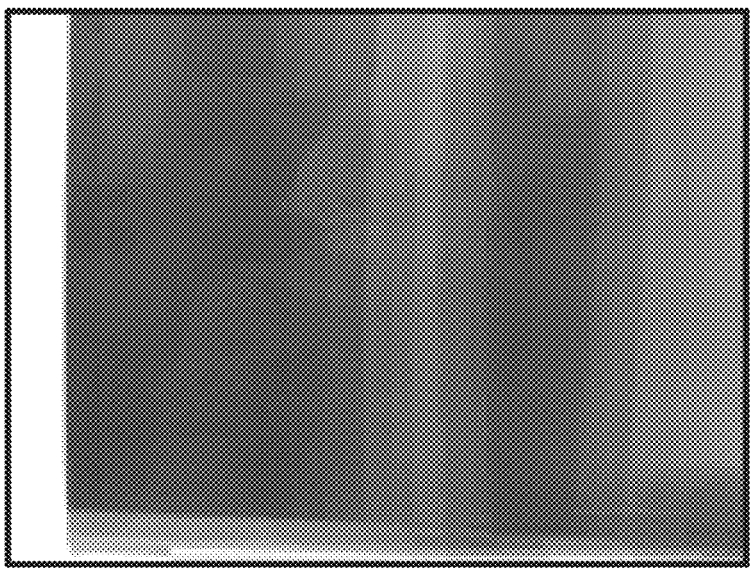

The image processor (204) can be configured to receive both the first diffraction image as shown in FIG. 3B and the second diffraction image as shown in FIG. 3C; convert both the first diffraction image and the second diffraction image into two intensity-only images, respectively; etc. For example, the first diffraction image as shown in FIG. 3B is converted into a first intensity-only image as illustrated in FIG. 3D, whereas the second diffraction image as shown in FIG. 3C is converted into a second intensity-only image as illustrated in FIG. 3E. As used herein, intensity may refer to a component pixel value in a component of a color space. Examples of components of a color space may include, but are not limited to only, any of luminance-related components, chroma-related components, primary color components such as red, green and blue, etc.

In some embodiments, the image processor (204) is configured to remove or reduce various environmental effects such as light reflections, ambient light, etc., from the first intensity-only image of FIG. 3D based on image data in the second intensity-only image of FIG. 3E.

Figure 3F:
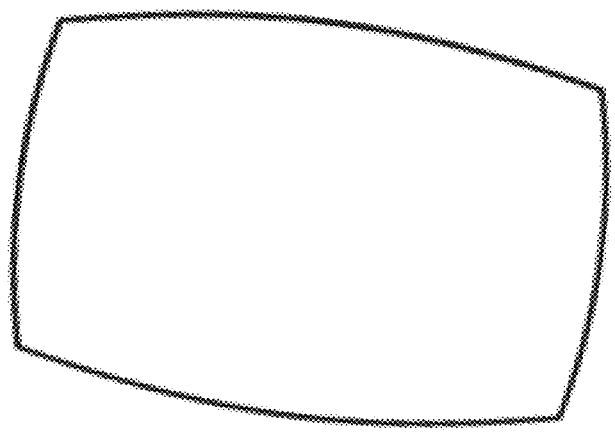
Figure 3G:
Figure 31:
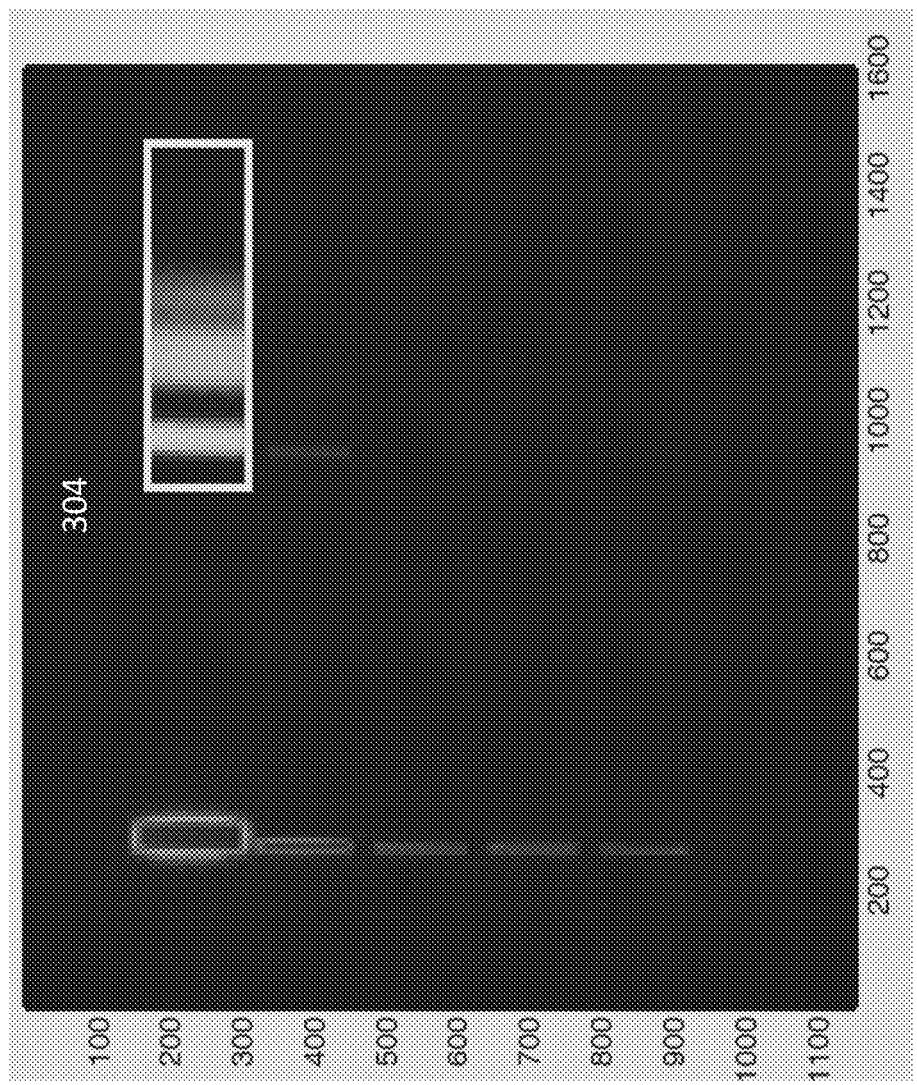

Additionally, optionally, or alternatively, the image processor (204) may be further configured to remove or reduce various environmental effects such as lens distortions, etc., from the first intensity-only image of FIG. 3D. For example, the first intensity-only image of FIG. 3D may comprise lens distortions as represented in FIG. 3F. In some embodiments, the image processor (204) may perform one or more transformations to remove the lens distortions from the first intensity-only image of FIG. 3D to generate an intensity-only image (e.g., as illustrated in FIG. 3H, etc.) with relatively little lens distortion as represented in FIG. 3G. The intensity-only image of FIG. 3H comprises scanline portions 302 representing zeroth-order light distributions, scanline portions 304 representing first-order light distribution, etc., as caused by diffracting light from the stimuli (112).

In some embodiments, the spectral analyzer (206) comprises software, hardware, a combination of hardware and software, etc., configured to analyze scanlines on the intensity-only image of FIG. 3H as generated by the image processor (204), from which various environmental effects such as light reflections, ambient light, lens distortions, etc., have been removed by the image processor (204). The spectral analyzer (206) may identify the scanline portions 302 and 304 on the intensity-only image of FIG. 3H that correspond to spectral distributions of the stimuli (112) of the target image of FIG. 3A; perform, based on pixel values of the scanlines 302 and 304 on the intensity-only image of FIG. 3H, measurements of intensity distributions along the scanlines; etc. The measurements of intensity may be performed using a scale as represented by a vertical axis of FIG. 3I along pixel column positions of the intensity-only image as represented by a horizontal axis of FIG. 3I.

Additionally, optionally, or alternatively, the spectral analyzer (206) may be further configured to determine, estimate, approximate, etc., a correspondence relationship between a relatively narrow vertical strip in the intensity-only image and light wavelengths based on a diffraction model used by the spectral characterization module (118). The diffraction model may be specific to one or more parameters related to the diffracting grating (108), the camera (106), etc. For example, a grating period of the diffraction grating (108), the focal length used by the camera (106) (e.g., which may be provided as a part of a diffraction image as described herein, etc.), pixel sizes (e.g., 50 micrometers, etc.) of one or more image sensors used by the camera (106), etc., can be used to estimate or compute a spatial distance of light of a specific wavelength as diffracted by the diffraction grating and focused by the camera (106) onto the one or more image sensors.

Additionally, optionally, or alternatively, the spectral analyzer (206) may be further configured to determine a correspondence relationship between the measurements of intensity as based on the pixel values of the intensity-only image and spectral power values. For example, spectral sensitivity profiles of the image sensors used by the camera (106) can be determined and used by the spectral characterization module (118) to establish or estimate the correspondence relationship between the measurements of intensity as based on the pixel values of the intensity-only image and spectral power values.

Figure 3J:
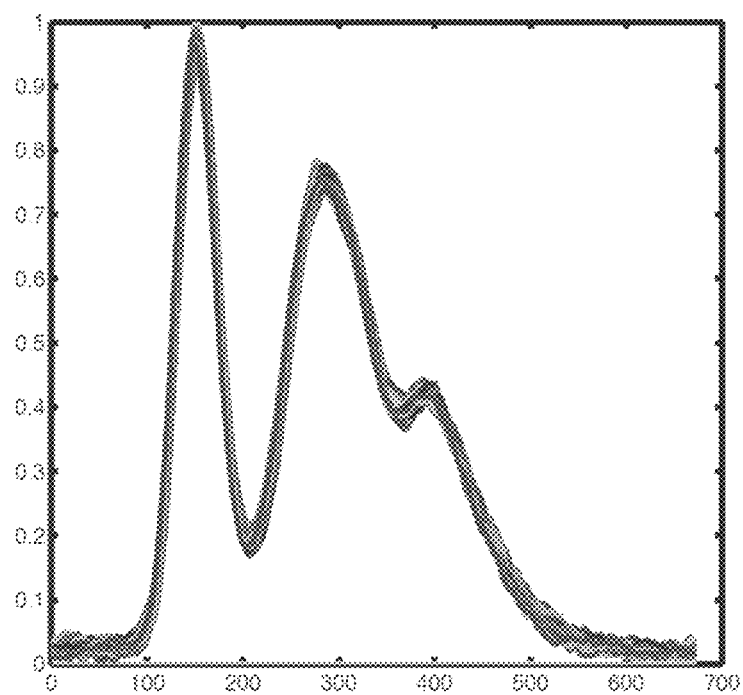
FIG. 3J and FIG. 3K illustrate example spectral power distributions generated from diffraction images.
Figure 3K:
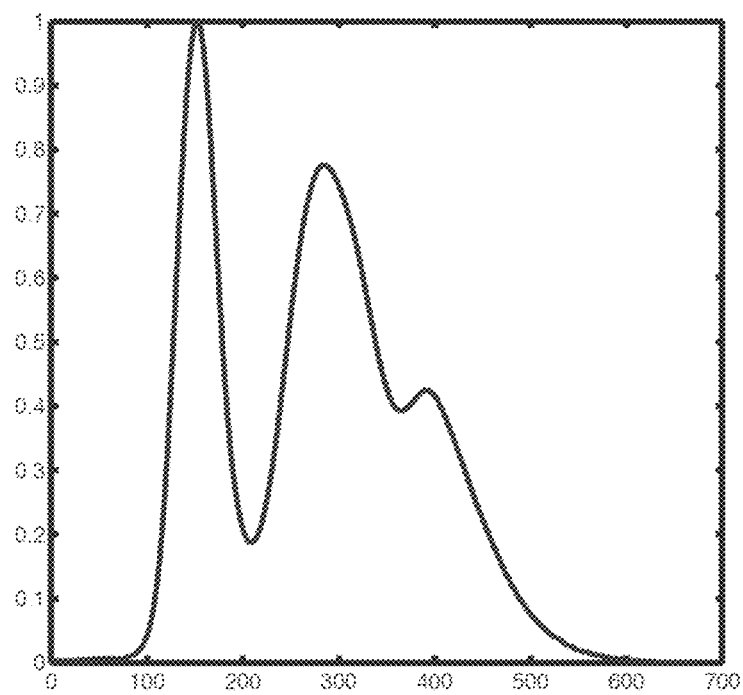

Based on these correspondence relationships, the spectral analyzer (206) can perform virtual line scanning, deconvolution, advance noise elimination functions, etc., to convert the intensity distributions as measured from the pixel values of the scanline portions 302 and 304 to spectral power distributions as illustrated in FIG. 3J. These spectral power distributions of FIG. 3J from multiple scanlines in the scanline portions 302 and 304 can be further processed (e.g., using mean values of the spectral distributions of FIG. 3J, etc.) into a single spectral power distribution as illustrated in FIG. 3K.

In some embodiments, the display capability measurement unit (208) comprises software, hardware, a combination of hardware and software, etc., configured to determine display capabilities of the display device (102) based on the spectral power distribution. The spectral power distribution represents a spectral power distribution of light generated by light sources used by the display device (102) and modified by the optical configuration of the display device (102) such as color filters, light modulation layers, the image rendering surface (114), etc.

Figure 4A:
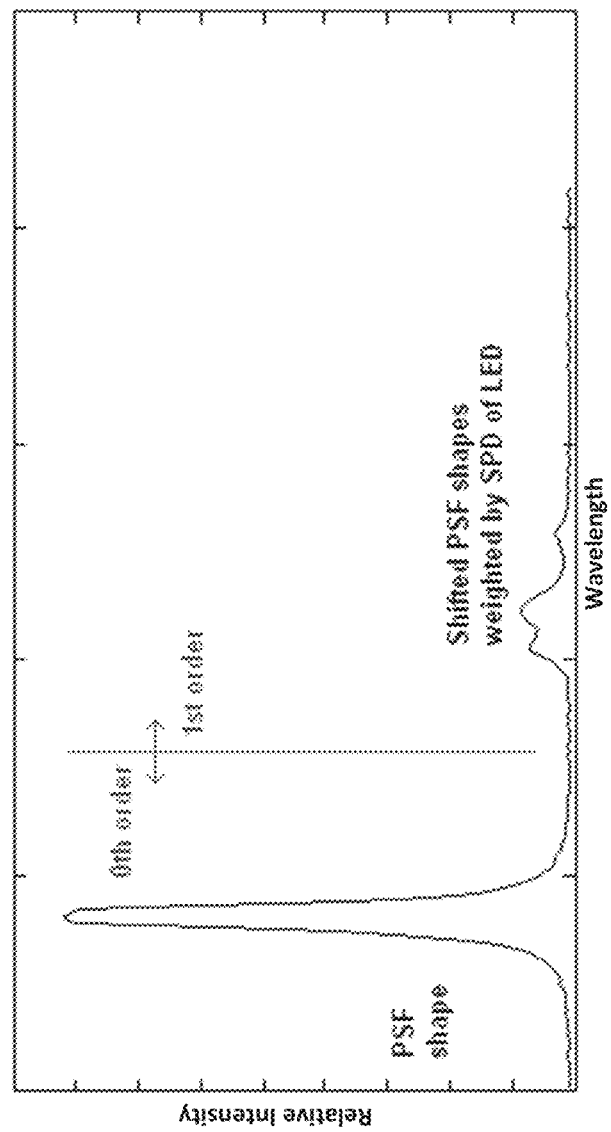
FIG. 4A illustrates an example intensity distribution derived from diffraction image(s)

In some embodiments, color rendering qualities and/or characteristics of the display device (102) can be determined by the spectral characterization module (118) based on graphical and/or numerical characteristics of the spectral power distribution of the display device (102). For example, a display device that supports a color gamut as defined in an REC. 2020 display device may have very narrow band primaries, as illustrated in FIG. 4E. A display device using LEDs may have slightly wider primaries, as illustrated in FIG. 4D. A display device using CCFLs may show gas-like bands in the spectral power distribution.

In some embodiments, CIE XYZ values for each of one or more primary colors such as red, green, blue, etc., can be computed by the spectral characterization module (118) based on the spectral power distribution of the display device (102) and CIE color-mapping functions representing 2 degree observer, 10 degree observers, etc. These CIE tristimulus values may be converted to CIE XYZ values for the purpose of deriving a white point for the display device (102). Additionally, optionally or alternatively, a maximum luminance level of the display device (102) can be determined (e.g., approximately, etc.) or estimated based on a series of (e.g., diffractive, non-diffractive, etc.) images taken with different exposure times, comparing the same pixels intensity on each image of the exposure series as function of exposure time.

Additionally, optionally, or alternatively, spectral power distributions as described herein can be used (e.g., by a display device, by a spectral characterization module, etc.) to compute or set custom color transform matrices (e.g., when factory-set matrices no longer apply, etc.) for color space transformations, for spectral color processing (e.g., to support a relatively large color gamut, to maximally support color gamut, etc.) for display devices that may be capable of using three or more primary colors in display applications, etc.

In some embodiments, some or all of the spectral power distribution and/or values, matrixes, etc., derived from the spectral power distribution can be provided by the spectral characterization module (118), or the display capability measurement unit (208) therein, to the display device (102), or a display management (DM) module therein such as Dolby Vision DM module, etc., to set the display primaries and white point of the display device (102).

In some embodiments, for the purpose of (e.g., qualitatively, quantitatively, numerically, etc.) characterizing a target display device (e.g., 102 of FIG. 1A or FIG. 1D, etc.), a test pattern may be displayed on an image rendering surface (e.g., 114 of FIG. 1A or FIG. 1D, etc.) of the display device (102). In some embodiments, the test pattern is composed of specifically designed targets or stimuli (e.g., red, green, blue, white, gray, yellow, cyan, magenta, etc.). In some embodiments, the test pattern is composed of two more patches with various levels of brightness, color saturation, etc. strong and weak signals. A test pattern may be dynamically or iteratively change patches in terms of one or more of shapes, spatial locations on the image rendering surface (114), brightness, color saturation, etc.

A camera (e.g., 106 of FIG. 1A or FIG. 1D, etc.) equipped with a diffraction grating (e.g., 108 of FIG. 1A or FIG. 1B, etc.) can take diffraction images of the test pattern as rendered by the display device (102) on the image rendering surface (114). These diffraction images can be used to generate intensity distributions of each of those targets or stimuli as spatial pixel intensity distributions (or spectral patterns).

These intensity distributions of the targets or stimuli in the test pattern can then be used to generate a spectral power distribution of the display device (102) and create a characterization profile (or a descriptor) of display capabilities of the display device (102). The characterization profile may comprise display capability information such as a white point, primary colors, non-linearity (e.g., as related to color tints of gray levels, etc.), etc., of the display device (102). Examples of non-linearity may include, but are not limited to only, any of variations in different shades of grays such as yellowish in mid-level grays, bluish in bright-level grays, etc.

The display capability information in the characterization profile in turn can be used to create display mapping parameters for performing display management mapping operations with the display device (102) so that artistic intent (e.g., colors, luminance levels, contrasts, highlights, etc.) represented in a media program can be faithfully expressed by the display device (102). Compensative or corrective actions may be implemented by display management operations to compensate or correct variations detected in the primary colors, white point, different shades of grays, etc. In some embodiments, lookup table can be used for the purpose of mapping perceptual-based or non-perceptual-based code values in a video signal to correct digital drive values to be used by the display device (102).

6. Spectral Analysis Of Diffraction Images

Light diffracted by a diffraction grating comprises zeroth-order diffracted light (e.g., with no diffraction, etc.), first-order diffracted light, second-order diffracted light, etc. For the purpose of illustration only, diffracted light of an order that is higher than the first-order may be neglected as being sufficiently weak not to disturb spectral characterization of display devices. The zeroth-order diffracted light and the first-order diffracted light may or may not overlap with each other in a spectral pattern as captured by an image sensor, depending on a spatial size of a target or stimulus, a grating period of a diffraction grating, an aperture of a camera, a focal length of a lens used to collect light onto the image sensor, a spatial size of each pixel on the image sensor, etc.

In some embodiments, spectral characterizations of display devices can be performed in various configurations of capturing zeroth-order diffracted light and first-order diffracted light. In a first configuration, zeroth- and first-order diffracted light incidents but does not spatially overlap on a single image sensor, as illustrated in FIG. 4A. In a second configuration, zeroth- and first-order diffracted light incidents and spatially overlaps on a single image sensor. In a third configuration, only first-order diffracted light incidents on a single image sensor. In a fourth configuration, first-order diffracted light incidents on a first image sensor, while second order diffracted light incidents on a second image sensor.

These configurations of capturing diffracted light, including but not limited to the first configuration, etc., can benefit from using a linear diffraction grating which produces diffraction images or spectral patterns (e.g., 304 of FIG. 3H, etc.) along one dimension. For example, as illustrated in FIG. 4A, in the first configuration in which the zeroth- and first-order diffracted light does not spatially overlap on a single image sensor, the original image of a stimulus can be captured or generated using the zeroth-order diffracted light that is separate from the first-order diffracted light. In the meantime, a spectral-spatial distribution of the stimulus or an intensity distribution captured by the camera (106) can be established or resolved by a spectral characterization module (e.g., 118 of FIG. 1D, etc.) by applying virtual line scanning techniques, by applying deconvolution techniques, by applying advance noise elimination functions or processing, etc. The spectral-spatial distribution of the stimulus comprises spectral content (e.g., light intensity at each wavelength, etc.) associated with each spatial location of the stimulus as rendered on an image rendering surface (e.g., 114 of FIG. 1A, etc.).

In some embodiments, a hyperspectral image of the stimulus on the image rendering surface (114) can be captured by applying virtual line scanning techniques. The hyperspectral image may be used to represent or obtain the spectral-spatial distribution of the stimulus.

Figures 4B, 4C:
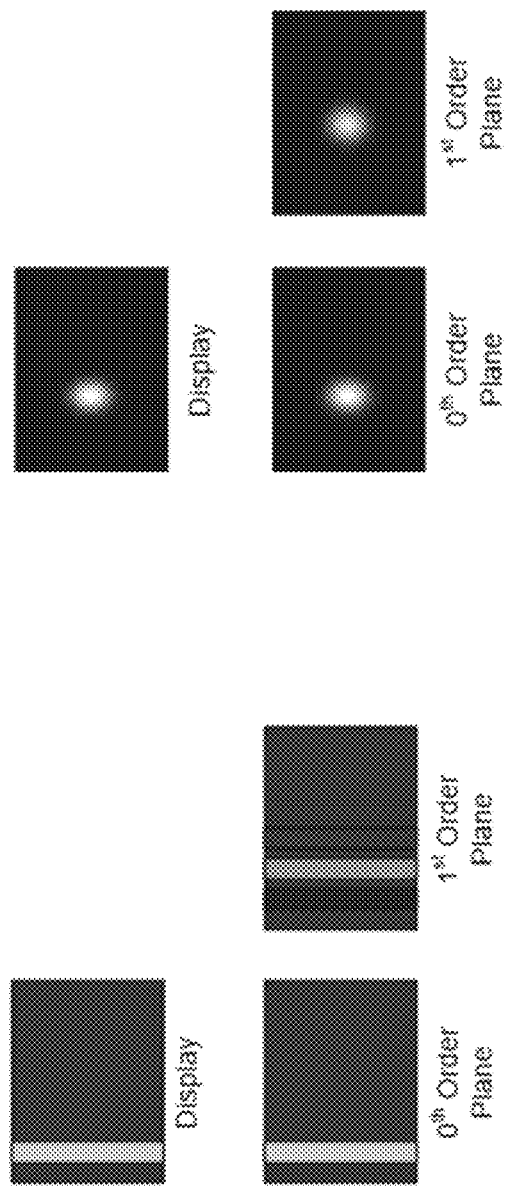
FIG. 4B illustrates an example diffraction image area related to virtual line scanning.
FIG. 4C illustrates an example diffraction image area to be analyzed with deconvolution.
Figures 4D, 4E:
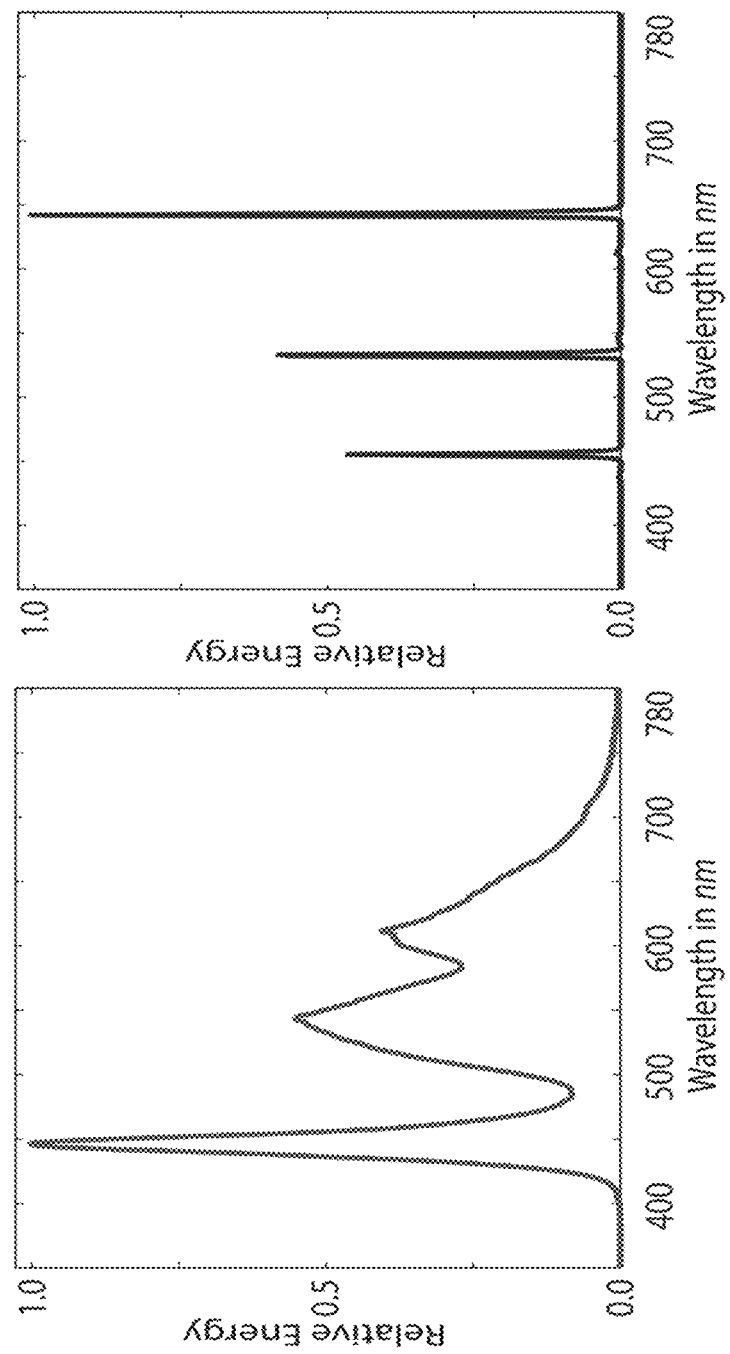
FIG. 4D and FIG. 4E illustrate example spectral power distributions.

Instead of performing line scanning by using a mechanical means such as sliding a narrow slit across the field of view of a camera (e.g., 106 of FIG. 1A or FIG. 1D, etc.), under techniques as described herein, a spectral characterization module (e.g., 118 of FIG. 1D or FIG. 2, etc.) can cause the display device (102) to perform virtual line scanning by displaying, and capturing a diffraction image of, only a relatively narrow vertical strip of the stimulus at any given time, as illustrated in FIG. 4B. By electronically driving the display device (102) to slide the relatively narrow vertical strip (e.g., 1 pixel wide, 2 pixels wide, 4 pixels wide, etc.) across the stimulus over time while capturing a sequence of diffraction images of the relatively narrow vertical strip during this sliding, it is possible to prevent or reduce overlapping between the zero-order diffracted light and the first-order diffracted light on the diffraction image. Based at least in part on the first-order diffracted light as captured on the diffraction image for each of a set of narrow vertical strips that cover the stimulus, a spectral power distribution of the display device (102) can be characterized, obtained, estimated, etc.

As a result, the camera (106) with a linear diffraction grating (e.g., 108 of FIG. 1A, etc.) can be used in combination with a virtual line scanning process that controls a display device to display a relatively narrow strip of a stimulus at any given time for the purpose of generating a hyperspectral image of the stimulus as rendered on an image rendering surface by the display device, and deriving a spectral power distribution of the display device (102).

Different configurations of capturing diffracted light—whether or not zeroth-order diffracted light and first-order diffracted light in these configurations may overlap on diffraction images—can also use deconvolution to obtain spectral power distributions of display devices as described herein. diffraction image data that captures a convolution of zeroth-order image data and first-order image data can be analyzed by a deconvolution process to determine a spectral-spatial distribution with a relatively few diffraction images. Here, image data may refer to pixel values generated from sensory responses of the image sensor such as accumulated charges in a CCD (CMOS, Foveon, etc.) image sensor to the zeroth-order diffracted light, etc. In some embodiments in which diffraction is one dimensional (e.g., along a spatial direction 120 of FIG. 1A, etc.), the deconvolution process is greatly simplified as image data in scanlines vary along only one spatial dimension (e.g., horizontal direction, etc.) in the captured diffraction image data; thus the image data can be processed to generate a spectral power distribution by a 1D deconvolution process (e.g., implemented by a spectral characterization module 118 of FIG. 1D, etc.) instead of generally a 2D deconvolution process.

In some embodiments, the 1D deconvolution process can be configured to derive or estimate a spatial shape of the stimulus based on image data captured in the zeroth-order diffraction image area (e.g., the $0^{th}$ order plane of FIG. 4C, etc.) of one or more diffraction images. This spatial shape (e.g., approximately, in zeroth order, etc.) represents an image formed by light from a stimulus as rendered on the image rendering surface (e.g., the display of FIG. 4C, etc.), as spatially dispersed by point spread functions associated with the optical path from the image rendering surface (114) to an imaging plane of the camera (106) at which the image sensor is located.

The 1D deconvolution process may further construct or model a predicted shape in the first-order diffraction image area (e.g., the $1^{st}$ order plane of FIG. 4C, etc.) of the one or more diffraction images for all wavelengths by using (e.g., standard, etc.) diffraction grating equations, by using prior system calibration results of spatial shift or distribution per wavelength, etc. Using the spatial shape of the stimulus and the predicated shape as initial conditions or parameter values, the deconvolution process can solve for the spectral power distribution by (e.g., iteratively, etc.) converging until the predicted shape multiplied by shifted copies of, or convoluted with, the spatial shape sums to the image data captured in the first-order diffraction image area of the one or more diffraction images, for example within a specific error threshold or tolerance.

Under techniques as described herein, spectral characterization can be efficiently performed (e.g., using virtual line scanning, deconvolution, etc.) for display devices with a wide variety of image rendering surfaces such as cathode ray tube (CRT) televisions; liquid crystal display (LCD) panel with light sources based on cold-cathode fluorescent lamps (CCFL), light emitting diodes (LEDs), quantum dot, etc.; organic LED displays; LED displays, front projection displays; rear projection displays; laser based projection or backlight; etc.

Additionally, optionally, or alternatively, these techniques can be applied to obtain spectral-spatial distributions of light as generated by, as passed through, etc., one or more optical components, light source components, etc., in a display device.

In some embodiments, a light source in a display device (e.g., 102 of FIG. 1A or FIG. 1D, etc.) such as a dual-modulation display device, an N-modulation display device, etc., may comprise a plurality of light emitters such as a plurality of LEDs, etc. Virtual line scanning, deconvolution, etc., as described herein can be used to determine a spectral power distribution, a point spread function, CIE XYZ values, etc., of up to each light emitter in the plurality of light emitters. For example, a spectral characterization module (e.g., 118 of FIG. 1D, etc.) can be configured to control an operational state of each light emitter in the plurality of emitters in the display device (102), turn each light emitter on (e.g., successively, sequentially, etc.) to determine a spectral power distribution, a point spread function, CIE XYZ values, etc., of that light emitter by setting light modulation layers or modules in the display device (102) to maximally transmit light (in a transmissive display device) or maximally reflect light (in a reflective display device) from an image rendering surface (e.g., 114 of FIG. 1A, etc.) of the display device (102), etc. The light from the image rendering surface (114) can be captured in diffraction images by a camera (e.g., 106 of FIG. 1A or FIG. 1D, etc.) covered with a diffraction grating (e.g., 108 of FIG. 1A or FIG. 1B, etc.).

In some embodiments, the shape of the point spread function of a light emitter in a display device (e.g., 102 of FIG. 1A or FIG. 1D, etc.) does not change at different wavelengths. Additionally, optionally, or alternatively, a spectral power distribution of the light emitter may be mathematically separable from the spatial shape. In some embodiments, image data in the first-order diffraction image area (e.g., the $1^{st}$ order plane of FIG. 3C, etc.) is a convolution of the shape of the point spread function with the spectral power distribution of the light emitter. A 1D deconvolution process can be performed sanline by scanline in captured image data of one or more diffraction images to recover both the shape of the point spread function and the spectral power distribution. Differences between a light emitter and a reference light emitter as detected from the spectral power distribution, the point spread function, the CIE XYX values, etc., can be used by the display device (102), an external device such as a set-top box, etc., to determine whether the light emitter is operating within an allowable tolerance range, perform corrective or compensative actions to avoid or ameliorate visual artifacts caused by any deviations from a (e.g., manufacturer-specified, a standard-based, etc.) reference spectral power distribution, a (e.g., manufacturer-specified, a standard-based, etc.) reference point spread function, (e.g., manufacturer-specified, a standard-based, etc.) CIE XYZ values, etc. Additionally, optionally, or alternatively, a light emitter that behaves very differently (e.g., out of the tolerance range, etc.) in terms of spectral power distribution, point spread function, CIE XYX, etc., from the norm may be replaced with a new light emitter.

Under some other approaches, an imaging colorimeter having multiple color channels of spectral responses that approximates the CIE 1931 color matching functions (CMFs) is used to measure spectral characteristics of a light emitter. However, under these approaches, data acquisition time can be relatively long as sequential exposures of each color channel need to be made. In addition, these other approaches may encounter errors from mismatch of sensory responses of the image colorimeter with defined CIE color mapping functions.

In sharp contrast, the techniques as described herein can capture diffraction images in a relatively short time, concurrently receive image data in different color channels in all wavelengths of a light emitter, avoid mismatch of sensory responses with CIE color mapping functions by computing CIE XYZ directly based on a determined spectral power distribution, etc.

Techniques as described herein can operate with a camera that is a monochrome image sensor, a color camera imager or color image sensors, an image sensor having color filters, etc. To achieve accurate results in spectral characterization, a camera (e.g., 106 of FIG. 1A or FIG. 1D, etc.) and its lens may be calibrated and characterized. In some embodiments, white balancing, spectral sensitivity, etc., of the camera (106) is calibrated, fixed, or at least known (e.g., for the purpose of converting image data to spectral intensity either in relative or absolute values, etc.).

In some embodiments, a spectral characterization module (e.g., 118 of FIG. 1D, a mobile application on a mobile device, etc.) can read out version information of a computing device such as a mobile camera phone, query an internal or external data store to determine geometrical parameters, optical parameters, spectral sensitivity, etc., of a camera. In some embodiments, a light source (e.g., a common light source at home, an incandescent light bulb, etc.) with a known spectral power distribution can be used (e.g., by the spectral characterization module 118, etc.) to calibrate the camera (106). Additionally, optionally, or alternatively, color filters with well-defined notches in wavelength-dependent light absorption can also be used in conjunction with other optical or light source components to calibrate the camera as described herein.

Interpreting spectral information from spatially distributed (e.g., convolved, non-convolved, etc.) spectral patterns captured in diffraction images may depend to some extent on aligning (or perform angular calibration of) a diffraction grating in front of a camera as described herein. In some embodiments in which a camera phone case has a built in diffraction grating, the alignment can be controlled at the point of manufacturing. In some embodiments in which a diffraction grating is temporarily placed in front of a camera, for example, with tape or even with handholding, inaccurate spatial positioning or alignment of the first-order diffraction image area caused by misalignment of the diffraction grating can increase measurement error. To prevent this type of problem, in some embodiments, a specific band gap filter with a known wavelength (e.g., 500 nm, etc.) may be made on a diffraction grating. As the wavelength of the band gap filter is known, the band gap filter can be used to spatially calibrate the diffraction grating. Any missing spectral information in the first-order diffraction image area caused by the band gap can be reconstructed as most display devices have smooth Gaussian like spectral power distributions per channel.

7. Example Process Flows

FIG. 5 illustrates an example process flow according to an embodiment of the present invention. In some embodiments, one or more computing devices or components (e.g., a camera-equipped computing device, a computing device with a spectral characterization module, a display device, a set-top box, a multimedia device, etc.) may perform this process flow. In block 502, a spectral characterization device uses an image sensor of a camera configured with a diffraction grating to capture a diffraction image of an image rendering surface of a display device, for example, while a target image is being rendered on the image rendering surface of the display device.

In block 504, the spectral characterization device analyzes the diffraction image of the image rendering surface of the display device to obtain measurements of native display capabilities of the display device.

In block 506, the spectral characterization device transmits display capability data to a display management module for the display device. Additionally, optionally, or alternatively, in some embodiments, the spectral characterization device transmits display capability data to an ambient light management module for controlling properties of ambient light such as light bulb color, ambient light level to the extent that is controllable in a viewing environment in which the display device is presently operating. At least a portion of the display capability data is generated from the measurements of native display capabilities of the display device that are obtained from analyzing the diffraction image of the image rendering surface of the display device.

In an embodiment, a process flow as described herein is performed by a mobile device comprising the camera and a computer application that is configured to analyze diffraction images of the image rendering surface of the display device on which target images are rendered.

In an embodiment, a process flow as described herein is performed by the display device connected with the camera; the display device is configured to analyze diffraction images of the image rendering surface of the display device on which target images are rendered.

In an embodiment, the display device is configured to analyze ambient light conditions in a viewing setting in which the display device is deployed.

In an embodiment, the camera is a part of a computing device that is communicatively linked with the display device. In an embodiment, the computing device instructs the display device to render the target image on the image rendering surface of the display device.

In an embodiment, the display device stores image data for the target image in persistent data store of the display device.

In an embodiment, the target image is retrieved by the display device from an image data source.

In an embodiment, the spectral characterization device is further configured to perform: using the image sensor of the camera configured with the diffraction grating to capture a second diffraction image of a black screen on the image rendering surface of the display device; removing, based on the second diffraction image, ambient light contributions from the image of the image rendering surface of the display device. The diffraction image of the image rendering surface of the display device after the ambient light contributions are removed based on the second diffraction image is analyzed to obtain the measurements of the native display capabilities of the display device.

In an embodiment, the spectral characterization device is further configured to perform: removing lens distortions from the diffraction image of the image rendering surface of the display device. The diffraction image of the image rendering surface of the display device after the lens distortions are removed is analyzed to obtain the measurements of the native display capabilities of the display device.

In an embodiment, the spectral characterization device is further configured to perform: determining one or more spectral characteristics of the camera; calculating, based on the one or more spectral characteristics of the camera and the diffraction image, a spectral power distribution related to a stimulus as rendered on the image rendering surface of the display device.

In an embodiment, the target image as rendered on the image rendering surface of the display device comprises a stimulus; the spectral characterization device is further configured to perform: obtaining a first-order scanline from the diffraction image of the image rendering surface for the stimulus as rendered on the image rendering surface of the display device; determining a spectral power distribution related to the stimulus as rendered on the image rendering surface of the display device.

In an embodiment, the spectral characterization device is further configured to compute a set of international commission on illumination (CIE) tristimulus values based on the spectral power distribution.

In an embodiment, the spectral characterization device is further configured to derive a white point based on the set of CIE tristimulus values computed based on the spectral power distribution.

In an embodiment, the display management module represents one of a set-top box, a multimedia device, a computing device external to the display device, or a control module within the display device.

In an embodiment, the spectral characterization device is further configured to perform: capturing an exposure series of one or more diffraction images of one or more stimuli of gray patches rendered on the image rendering surface of the display device; establishing one or more relationships between pixel values in the one or more diffraction images and respective exposure times used to generate the one or more diffraction images; estimating a maximum luminance that the display device is configured to generate based at least in part on the one or more relationships between the pixel values in the one or more diffraction images and the respective exposure times used to generate the one or more diffraction images.

In an embodiment, the diffraction grating comprising a specific band gap filter for calibrating spectral distribution in a first-order scanline from the diffraction image of the image rendering surface for the stimulus as rendered on the image rendering surface of the display device.

In an embodiment, the spectral characterization device is further configured to transmit the display capability data to a display capability data repository system that stores display capability information for a plurality of display devices.

In an embodiment, the spectral characterization device is further configured to receive one or more of analytical results, calibration data, or display management data from the display capability data repository system.

In an embodiment, a computing device such as a display device, a mobile device, a set-top box, a multimedia device, etc., is configured to perform any of the foregoing methods. In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods. Note that, although separate embodiments are discussed herein, any combination of embodiments and/or partial embodiments discussed herein may be combined to form further embodiments.

8. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
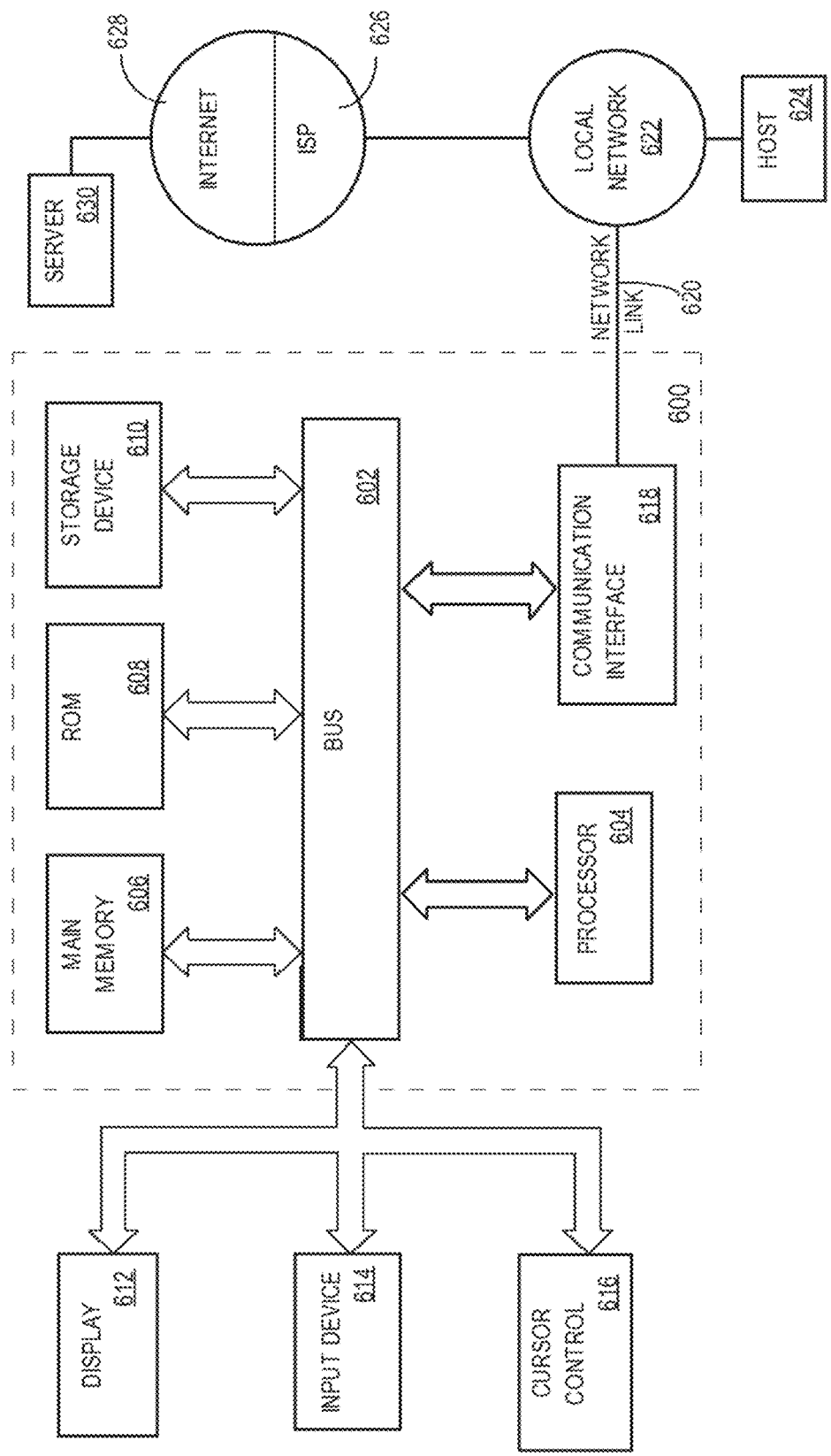
FIG. 6 illustrates an example hardware platform on which a computer or a computing device as described herein may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a liquid crystal display, for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques as described herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

9. Equivalents, Extensions, Alternatives And Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
   rendering a target image on an image rendering surface of a display device;
   capturing a diffraction image of the image rendering surface of the display device using an image sensor of a camera configured with a diffraction grating, while the target image is being rendered on the image rendering surface of the display device;
   analyzing the diffraction image of the image rendering surface of the display device to obtain measurements of native display capabilities of the display device;
   transmitting display capability data to a display management module for the display device to cause the display device to render images based at least in part on the display capability data, wherein at least a portion of the display capability data is generated from the measurements of native display capabilities of the display device that are obtained from analyzing the diffraction image of the image rendering surface of the display device.

2. The method as recited in claim 1, wherein the method is performed by a mobile device comprising the camera and a computer application that is configured to analyze diffraction images of the image rendering surface of the display device on which target images are rendered.

3. The method as recited in claim 1, wherein the method is performed by the display device connected with the camera, and wherein the display device is configured to analyze diffraction images of the image rendering surface of the display device on which target images are rendered.

4. The method as recited in claim 3, wherein the display device is configured to analyze ambient light conditions in a viewing setting in which the display device is deployed.

5. The method as recited in claim 1, wherein the camera is a part of a computing device that is communicatively linked with the display device.

6. The method as recited in claim 5, wherein the computing device instructs the display device to render the target image on the image rendering surface of the display device.

7. The method as recited in claim 1, wherein the display device stores image data for the target image in persistent data store of the display device.

8. The method as recited in claim 1, wherein the target image is retrieved by the display device from an image data source.

9. The method as recited in claim 1, further comprising:
   using the image sensor of the camera configured with the diffraction grating to capture a second diffraction image of a black screen on the image rendering surface of the display device;
   removing, based on the second diffraction image, ambient light contributions from the image of the image rendering surface of the display device;
   wherein the diffraction image of the image rendering surface of the display device after the ambient light contributions are removed based on the second diffraction image is analyzed to obtain the measurements of the native display capabilities of the display device.

10. The method as recited in claim 1, further comprising:
    removing lens distortions from the diffraction image of the image rendering surface of the display device;
    wherein the diffraction image of the image rendering surface of the display device after the lens distortions are removed is analyzed to obtain the measurements of the native display capabilities of the display device.

11. The method as recited in claim 1, further comprising:
    determining one or more spectral characteristics of the camera;
    calculating, based on the one or more spectral characteristics of the camera and the diffraction image, a spectral power distribution related to a stimulus as rendered on the image rendering surface of the display device.

12. The method as recited in claim 1, wherein the target image as rendered on the image rendering surface of the display device comprises a stimulus; and the method further comprising:
    obtaining a first-order scanline from the diffraction image of the image rendering surface for the stimulus as rendered on the image rendering surface of the display device;
    determining a spectral power distribution related to the stimulus as rendered on the image rendering surface of the display device.

13. The method as recited in claim 12, further comprising computing a set of international commission on illumination (CIE) tristimulus values based on the spectral power distribution.

14. The method as recited in claim 13, further comprising deriving a white point based on the set of CIE tristimulus values computed based on the spectral power distribution.

15. The method as recited in claim 1, wherein the display management module represents one of a set-top box, a multimedia device, a computing device external to the display device, or a control module within the display device.

16. The method as recited in claim 1, further comprising: capturing an exposure series of one or more diffraction images of one or more stimuli of gray patches rendered on the image rendering surface of the display device; establishing one or more relationships between pixel values in the one or more diffraction images and respective exposure times used to generate the one or more diffraction images; estimating a maximum luminance that the display device is configured to generate based at least in part on the one or more relationships between the pixel values in the one or more diffraction images and the respective exposure times used to generate the one or more diffraction images.

17. The method as recited in claim 1, wherein the diffraction grating comprises a specific band gap filter for calibrating spectral distribution in a first-order scanline from the diffraction image of the image rendering surface for a stimulus as rendered on the image rendering surface of the display device.

18. The method as recited in claim 1, further comprising transmitting the display capability data to a display capability data repository system that stores display capability information for a plurality of display devices.

19. The method as recited in claim 17, further comprising receiving one or more of analytical results, calibration data, or display management data from the display capability data repository system.

20. An apparatus comprising:
one or more processors;
a non-transitory computer readable storage medium, storing software instructions, which when executed by the one or more processors, cause the one or more processors to perform:
rendering a target image on an image rendering surface of a display device;
capturing a diffraction image of the image rendering surface of the display device using an image sensor of a camera configured with a diffraction grating, while the target image is being rendered on the image rendering surface of the display device;
analyzing the diffraction image of the image rendering surface of the display device to obtain measurements of native display capabilities of the display device;
transmitting display capability data to a display management module for the display device to cause the display device to render images based at least in part on the display capability data, wherein at least a portion of the display capability data is generated from the measurements of native display capabilities of the display device that are obtained from analyzing the diffraction image of the image rendering surface of the display device.

21. A non-transitory computer readable storage medium, storing software instructions, which when executed by the one or more processors, cause the one or more processors to perform:
rendering a target image on an image rendering surface of a display device;
capturing a diffraction image of the image rendering surface of the display device using an image sensor of a camera configured with a diffraction grating, while the target image is being rendered on the image rendering surface of the display device;
analyzing the diffraction image of the image rendering surface of the display device to obtain measurements of native display capabilities of the display device;
transmitting display capability data to a display management module for the display device to cause the display device to render images based at least in part on the display capability data, wherein at least a portion of the display capability data is generated from the measurements of native display capabilities of the display device that are obtained from analyzing the diffraction image of the image rendering surface of the display device.

\* \* \* \* \*